United States Patent [19]
Ensz

[11] Patent Number: 5,887,497
[45] Date of Patent: *Mar. 30, 1999

[54] RELEASE TOOL FOR TELESCOPING TOWING ARMS

[75] Inventor: Russell M. Ensz, Matlock, Iowa

[73] Assignee: Dethmers Manufacturing Company, Boyden, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 600,549

[22] Filed: Feb. 13, 1996

[51] Int. Cl.$^6$ .................................................. B25B 11/00
[52] U.S. Cl. ................................ 81/484; 81/15.9; 81/488; 29/237
[58] Field of Search ................................ 29/237; 81/484, 81/488, 15.9

[56] References Cited

U.S. PATENT DOCUMENTS

2,688,266  9/1954  Knudsen et al. .................... 81/15.9
3,432,908  3/1969  Miller ................................. 29/237

*Primary Examiner*—James G. Smith
*Attorney, Agent, or Firm*—Brian J. Laurenzo; Michael C. Gilchrist

[57] ABSTRACT

A release tool is provided to aid in the unlocking of extending towing arms. The tool is adapted to fit a tow bar assembly that has a telescoping towing arm which is locked in an extended position by a slideable collar. The collar is moveable between a locked position and a released position. When in the locked position, the collar holds catches in engagement with legs of the towing arm to hold the legs fixed relative to each other. When in the released position, the legs are free to telescope relative to each other. Stress can build-up in the towing arms making it difficult to move the collar from the locked position to the released position. The release tool of the present invention provides a mechanical advantage to aid in the movement of the collar from the locked position to the released position. A cam surface on the tool engages the collar and moves it from the locked position to the released position as a handle is rotated about a fulcrum means.

10 Claims, 12 Drawing Sheets

RELEASE TOOL FOR TELESCOPING TOWING ARMS

BACKGROUND OF INVENTION

The invention relates generally to hitching members for connecting a towed vehicle to a towing vehicle, and more particularly to a tool for use in moving a collar on a telescoping towing arm from a locked position to a released position to allow the towing arm to extend and collapse telescopically.

Tow bar assemblies for use as hitching members are common in the art. These assemblies generally use two towing arms which are coupled between a towing vehicle and a towed vehicle. It is desirable to be able to fold the tow bar assembly for storage. To this end, tow bar assemblies with collapsible arms have been suggested. This allows the towing arms to fit in a smaller space when not in use. Therefore, these towing arms are generally movable between a collapsed storage position, and an extended towing position. A preferred design for the towing arms uses an inner and an outer telescoping leg. They must be provided with some means for locking the arms in the extended position to hold the towed vehicle at a substantially constant distance from the towing vehicle during towing.

It has been shown in the prior art to use a slideable locking collar on telescoping towing arms in a tow bar assembly, as for example in U.S. Pat. No. 5,356,166, and in an application filed concurrently with this application, in order to accomplish locking the arms in place. This collar is moveable between a locked position and a released position. When in the locked position, the collar holds a catch in place through a hole in the outer telescoping leg and against a groove in the inner telescoping leg, thereby preventing the legs from telescoping relative to each other. Tension or compression can develop in the towing arms, thereby tending to force the catch outward, away from the inner leg. This presses the catch against the collar, making it difficult to move the collar from the locked position to the released position in order to collapse the legs.

The difficulties encountered in the prior art and discussed above are substantially eliminated by the present invention.

SUMMARY OF THE INVENTION

Accordingly, it is an object of the present invention to provide a system for moving a slideable collar on a telescoping towing arm from a locked position to a released position.

It is an object of the present invention to provide a tool which increases the releasing force applied on a slideable collar used on a telescoping towing arm.

It is an object of the present invention to provide a tool for moving a locking collar on a telescoping towing arm between a locked position and a released position that is comfortable to operate.

It is an object of the present invention to provide a tool for moving a locking collar on a telescoping towing arm between a locked position and a released position that is simple to operate.

By the present invention, it is proposed to meet these objectives and other more specific objectives which will become apparent as the description proceeds. To this end, a release tool for use on a locking telescoping towing arm is proposed. The tool is for use on towing arms that have a first leg for operable connection to a towing vehicle and a second leg telescopically received within the first leg for operable connection to a towed vehicle. A collar is received about the first leg and is slideable relative to the first leg between a locked position and a released position. When the collar is in the released position the second leg is free to move telescopically with respect to the first. When the collar is in the locked position the second leg is fixed relative to the first leg. The release tool itself has a cam surface for engagement with the collar. The release tool also has fulcrum means for engagement with the towing arm such that the cam surface is in engagement with the collar between the fulcrum means and the collar. The release tool also has a handle which has a first end in operable connection with the cam surface and a second end which is free to rotate about the fulcrum means between a locking position and a releasing position when the fulcrum means is engagement with the towing arm. The handle rotates the cam surface about the fulcrum means as the free end is moved from the locking position to the releasing position, causing the cam surface to move the collar from the locking position to the released position.

DETAILED DESCRIPTION OF PREFERRED EMBODIMENTS

Shown generally in the drawings is a release tool 112 according to the present invention. Also shown in the drawings is a tow bar assembly 12 on which the release tool 112 is suitable to be used. The tow bar assembly 12 uses a first towing arm 10 and a second towing arm 11. A first end 16 of each towing arms 10, 11 is connected to a coupling 14 which is suitable for attachment to a towing vehicle 148. A second end 18 of each towing arm 10, 11 is attached to a clevis 20 suitable for operable attachment to a towed vehicle 150. The tow bar assembly 12 therefore has a towing vehicle end 22 and a towed vehicle end 24. Each towing arm 10, 11 is provided with a collar 84 which is movable between a locked position, wherein the towing arm 10, 11 is rigidly fixed, and a released position, wherein the towing arm 10, 11 is free to telescope. The release tool 112 is used to move the collar 84 from the locked position to the released position. Describing the embodiment shown in FIG. 5, and beginning at the towed vehicle end 24, the tow bar assembly 12 is made up of the devises 20 which are bolted to the two towing arms 10, 11. The towing arms 10, 11 are pivotally connected to the coupling 14, which is in turn pivotally connected to a male receiver bar 26 which attaches to the towing vehicle 148 at the towing vehicle end 22 of the tow bar assembly 12.

It should be understood that the first towing arm 10 and the second towing arm 11 are identical. Therefore, except as noted, the following description applies to both towing arms 10, 11. Each clevis 20 has a tongue 28 which extends away from the towing arm 10 to which it is attached. The tongue 28 is provided with an aperture 30 for releaseably attaching the towing assembly 12 to a towed vehicle 150. An attaching dowel 32 is inserted through the aperture 30 and a corresponding hole (not shown) at the front of the towed vehicle 150, and is held in place by an attaching pin 34 inserted through a passageway 36 in the attaching dowel 32. The attaching dowel 32 and attaching pin 34 are conveniently retained at the towed vehicle end 24 of the towing assembly 12 by a retaining wire 38. A clevis bolt 40 pivotally connects the clevis 20 to the towing arm 10 so that the towing arm 10 may be attached to the towed vehicle 150 at a variety of angles.

Figure 13A:
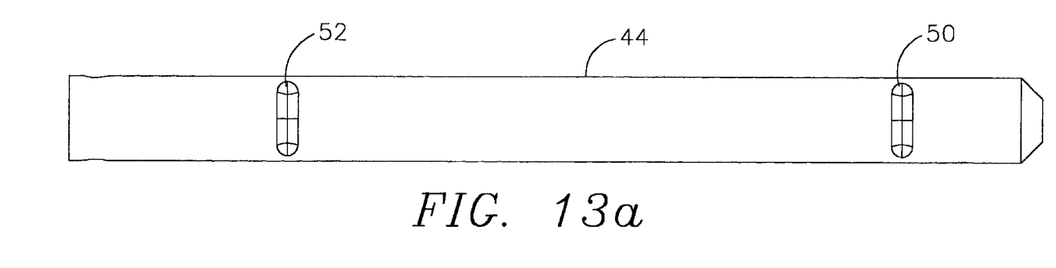
FIGS. 13a–c are details showing the second leg of a the tow bar assembly of FIG. 5.
Figures 13B, 13C:
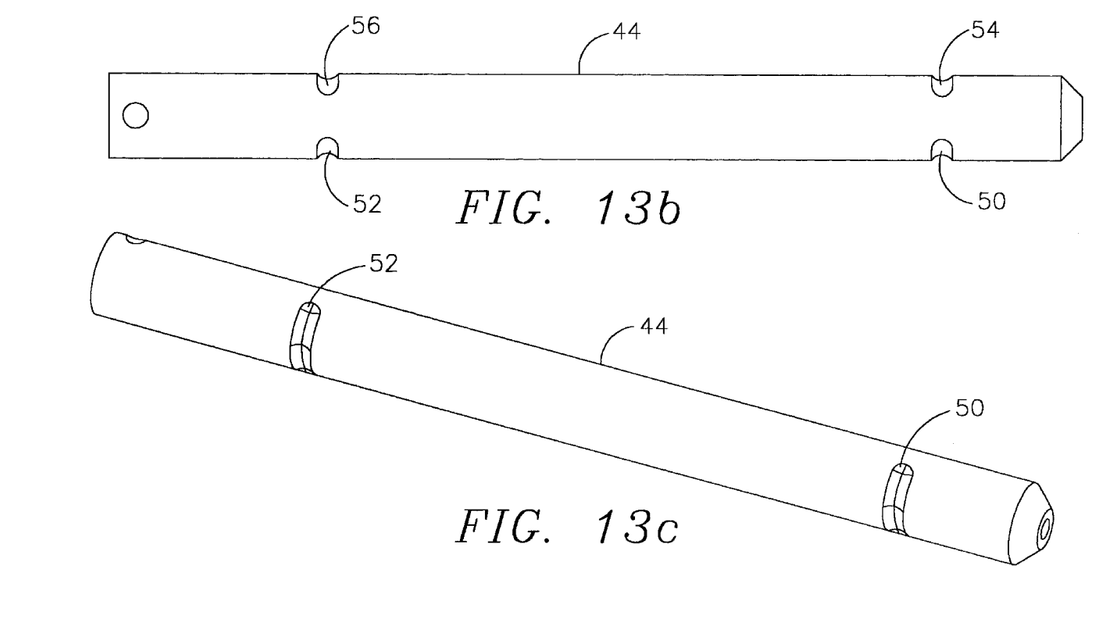

The towing arm 10 has a first leg 42 and a second leg 44. As best seen in FIGS. 13a–c, the second leg 44 is basically an elongated circular bar. The second leg 44 has a first end section 46 and a second end section 48. A first 50, second 52, third 54, and fourth 56 groove are provided in the second leg 44. Importantly, none of these grooves 50, 52, 54, 56 completely encircles the second leg 44; therefore, the second leg 44 is weakened less by the grooves 50, 52, 54, 56 than if they encircled the second leg 44. The second leg 44 may be constructed of a solid bar, or a thickwalled tube. A solid bar is believed to be preferable as it will allow improved machining of the grooves 50, 52, 54, 56.

Figures 1, 2, 3, 4:
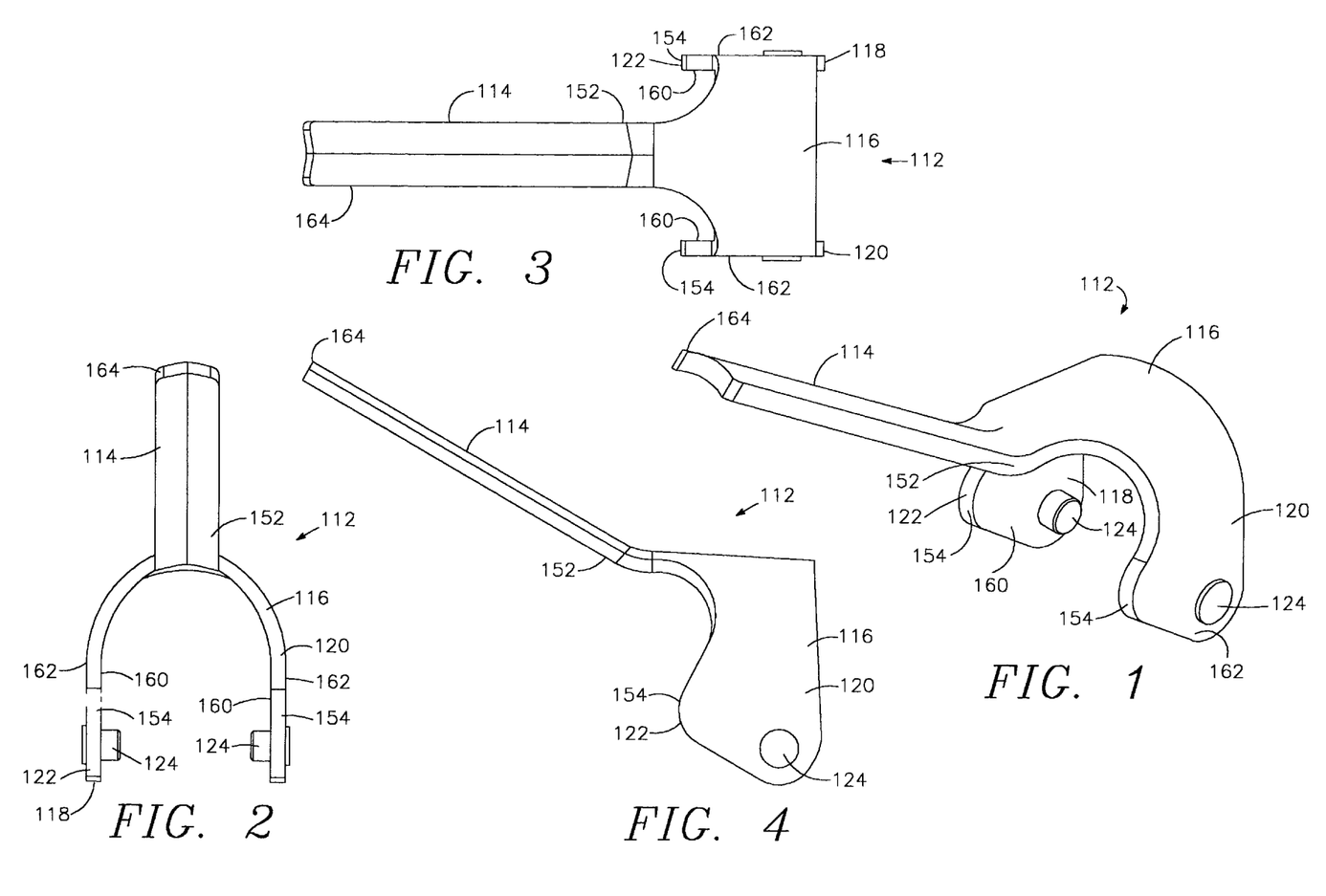
FIG. 1 is a perspective view of a release tool in accordance with the present invention.
FIG. 2 is a rear elevational view of the release tool shown in FIG. 1.
FIG. 3 is a plan view of the release tool shown in FIG. 1.
FIG. 4 is a side elevational view of the release tool shown in FIG. 1.

The first groove 50 is located in the first end section 46 of the second leg 44. The third groove 54 is also located in the first end section 46 of the second leg 44, diametrically opposite from the first groove 50. The first and third grooves 50, 54 are used in locking the towing arm 10 in an extended position (FIGS. 1 & 11) for towing. The second and fourth grooves 52, 56 are located in the second end section 48 of the second leg 44, diametrically opposite from each other. The second and fourth grooves 52, 56 are used for locking the towing arm 10 in a collapsed position (FIG. 12) for storage. It is contemplated that means other than the second and fourth grooves 52, 56 may be used to retain the tow bar assembly 12 in the collapsed position. For example, a cover (not shown) placed over the tow bar assembly 12 may be sufficient to hold the assembly 12 in the collapsed position for storage while also protecting the tow bar assembly 12 from the elements. As best seen in the exploded view of FIG. 6, the first leg 42 of the preferred embodiment is a circular tube having an inner diameter greater than the outer diameter of the second leg 44, so that the second leg 44 can fit telescopically within the first leg 42. The first leg 42 has a first end section 58 and a second end section 60 opposite from the first end section 58. A first 62 and second 64 opening are provided in the second end section 60 of the first leg 42, diametrically opposite from each other so that the grooves 50, 52, 54, 56 in the second leg 44 can be aligned with the openings 62, 64 in the first leg 42. The first opening 62 can be aligned with the first and second grooves 50, 52, and the second opening 64 can be aligned with the third and fourth grooves 54, 56. In the preferred embodiment, the second end section 60 is a machined spud 66 (FIG. 7) that welds on to a hollow tube 68 that forms the first end section 58 of the first leg 42.

Figure 5:
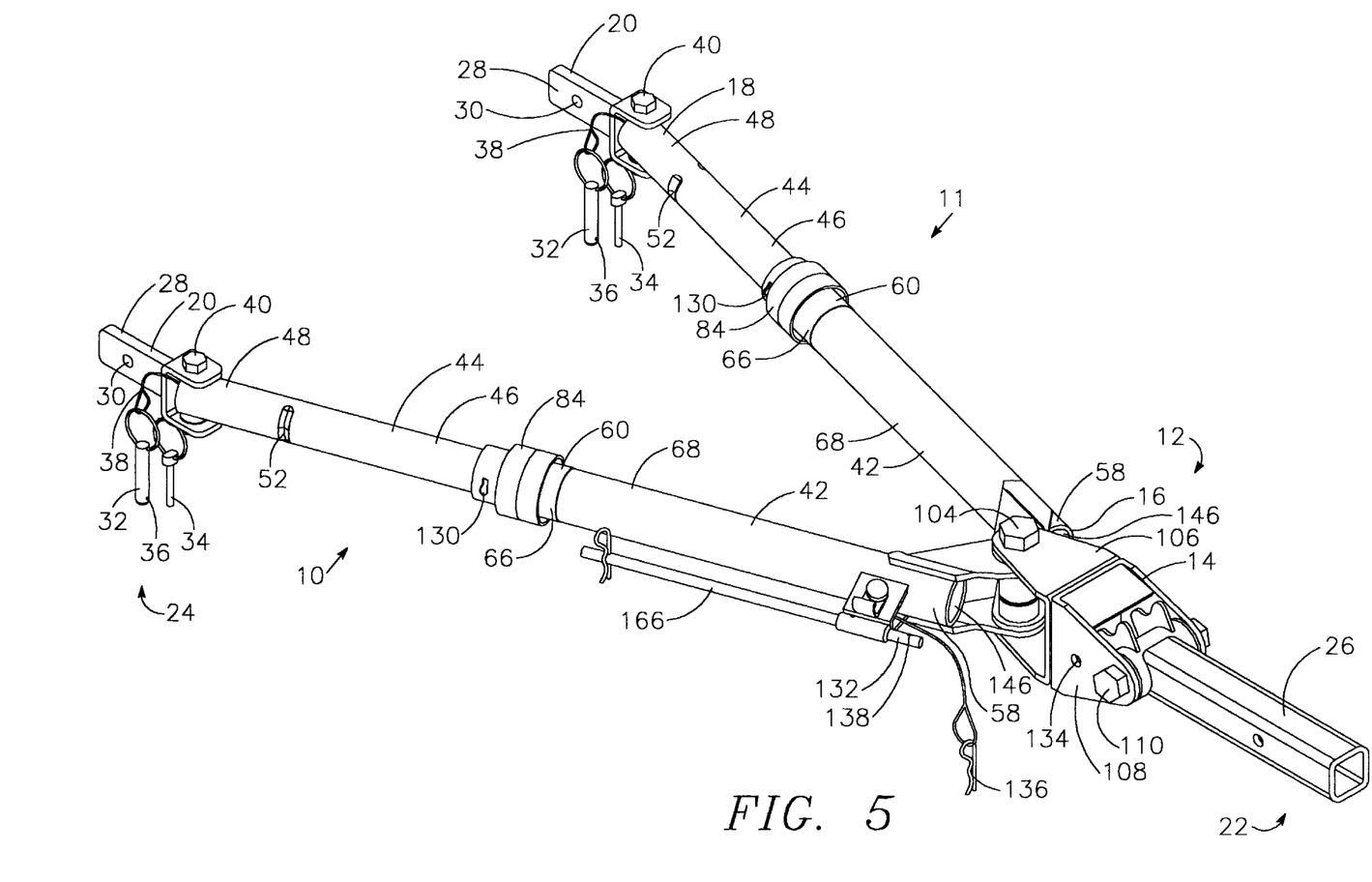
FIG. 5 is a perspective view of a towing assembly.

In the preferred embodiment of the tow bar assembly 12 shown in FIG. 5, the first end section 58 of the first leg 42 of one of the towing arms 10 has a wire support 166 attached. This wire support 166 is used as a spool to hold the lighting cable (not shown) during storage. The lighting cable is commonly used to connect the turn signal and brake light controls of the towing vehicle 148 to the turn signals and brake lights of the towed vehicle 150. The wire support 166 will also hold any excess cable during towing.

Figure 6:
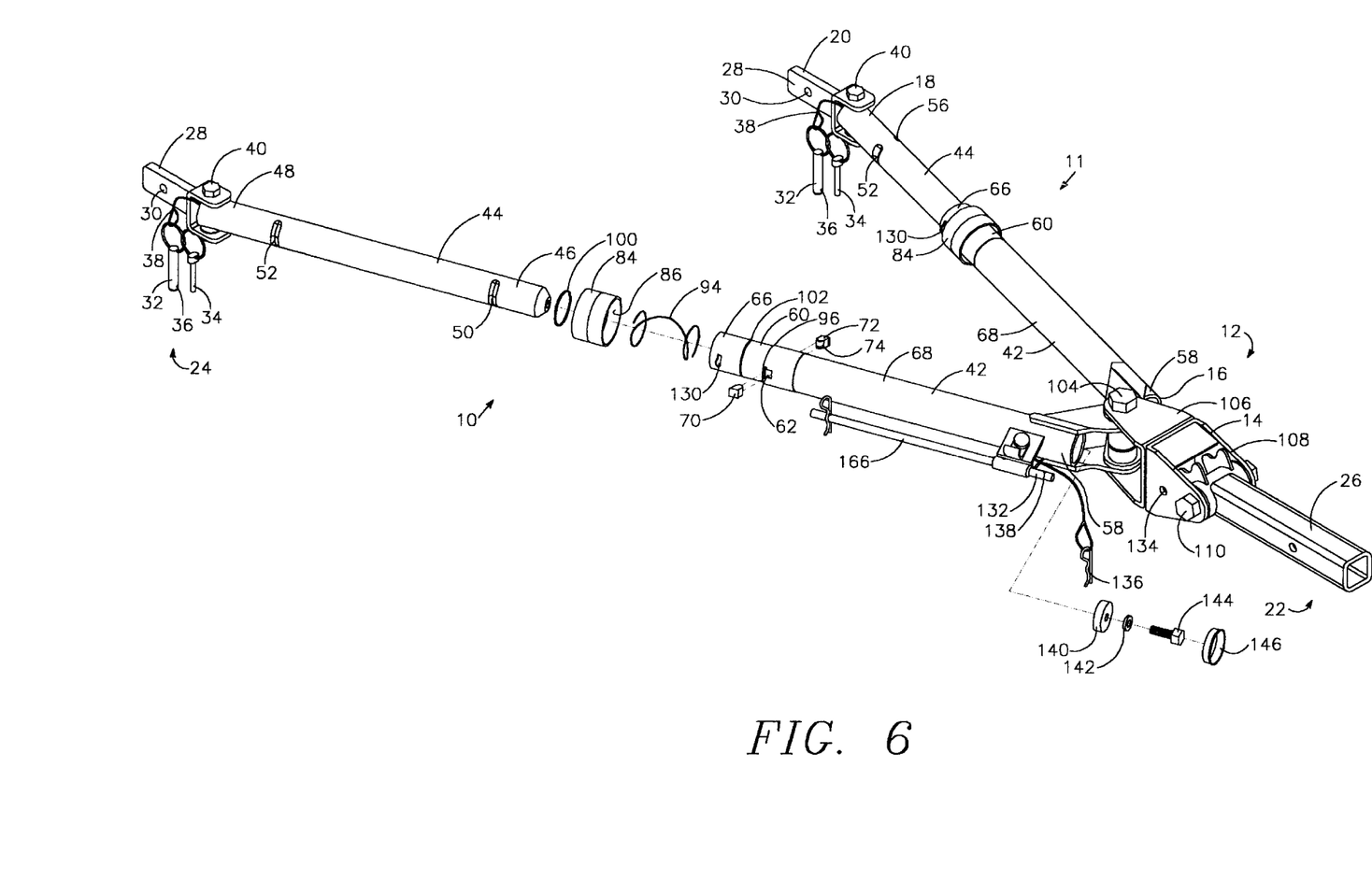
FIG. 6 is an exploded perspective view of the towing assembly of FIG. 5.

The second leg 44 is prevented from sliding out of the first leg 42 by a stop washer 140 fastened to the first end section 46 of the second leg 44 by a lockwasher 142 a bolt 144 (FIG. 6). The stop washer 140 is larger in diameter than an orifice (not shown) in the second end section 60 of the first leg 42, thereby preventing the first end section 46 of the second leg 44 from sliding past the orifice. An end cap 146 is provided for the first end section 58 of the first leg 42 to prevent water and other fouling agents from getting into the first leg 42.

Figure 7:
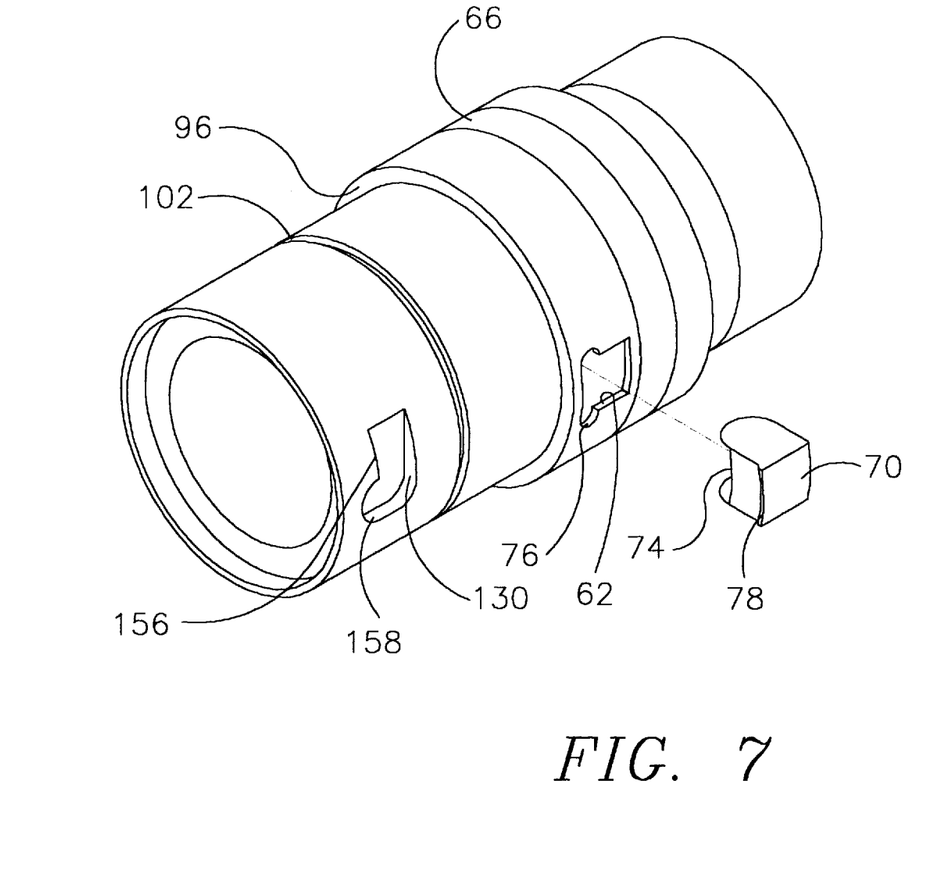
FIG. 7 is a perspective view of a machined spud and catch of one of the towing arms of FIG. 5.

A first 70 and a second 72 catch are provided that will fit at least partially through the first and second openings 62, 64 respectively. Preferably, the catches 70, 72 each have a saddle-shaped surface 74 to match the contours of the grooves 50, 52, 54, 56; however, the release tool 112 will work on towing arms 10 which use spherical catches. The saddle-shaped surface 74 allows maximum contact area between the catches 70, 72 and the grooves 50, 52, 54, 56. Some means needs to be provided to prevent the catches 70, 72 from passing completely through the first leg 42. In the preferred embodiment a notch 76 is machined part way through the spud 66 adjoining each of the openings 62, 64. A lip 78 on the catches 70, 72 engages the notch 76 (FIG. 7).

Figures 8A, 8B:
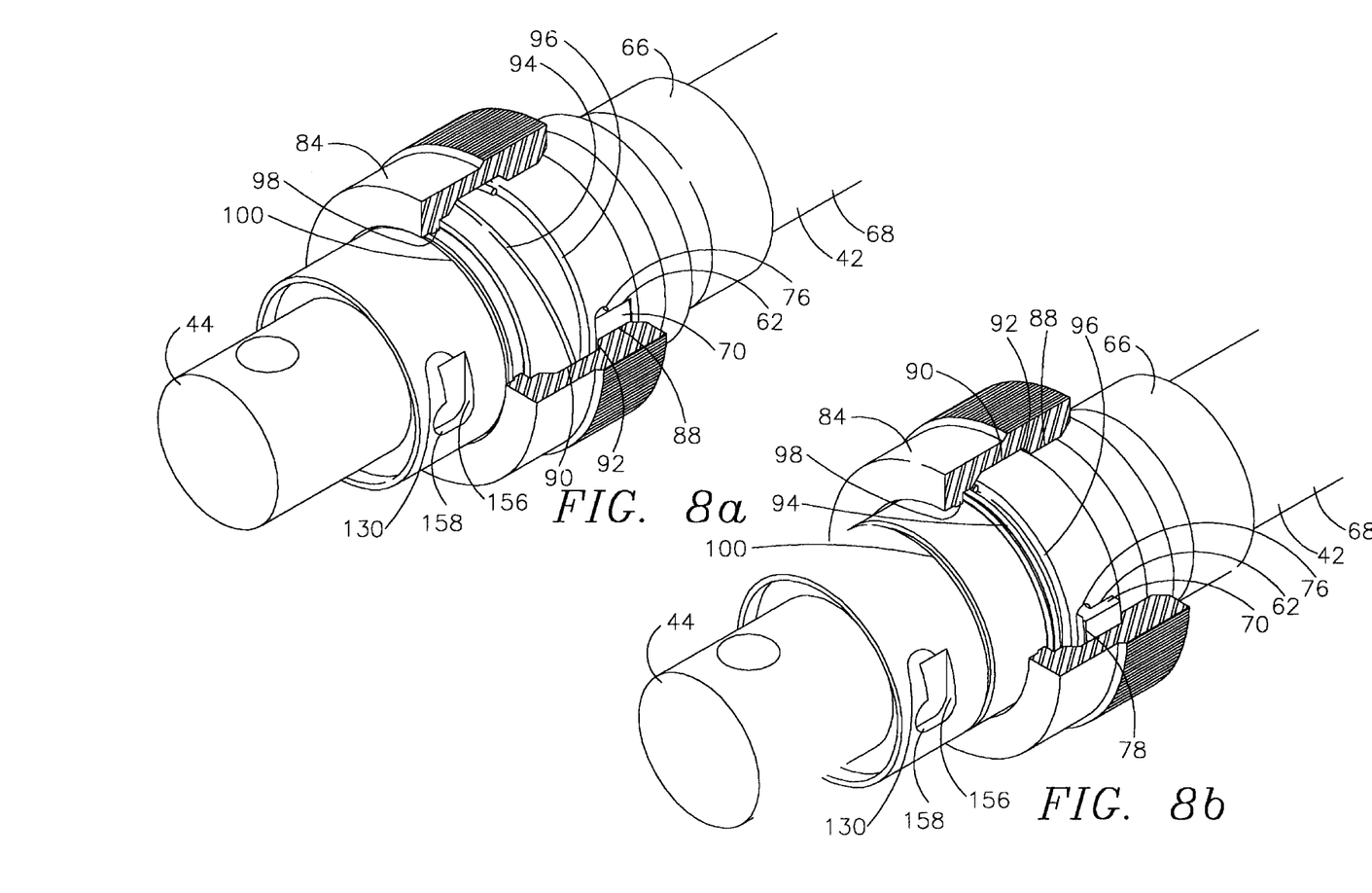
FIG. 8a is a detail perspective illustrating a towing arm in the collapsed position with the collar in a locked position.
FIG. 8b is a detail perspective of the towing arm of FIG. 8a with the collar moved to a released position.

The collar 84 slides over the spud 66 to control the position of the catches 70, 72. The collar 84 slides between a locked position (FIG. 8a) and a released position (FIG. 8b). When the collar 84 is in the locked position, it presses the catches 70, 72 inward toward the second leg 44 so that the saddle-shaped surfaces 74 are in engagement any of the grooves 50, 52, 54, 56 that are in alignment with the respective openings 62, 64. When the collar 84 is in the released position, the catches 70, 72 are allowed to move outwardly, away from the second leg 44, so that the saddle-shaped surfaces 74 disengage from the grooves 50, 52, 54, 56 and the second leg 44 is free to move telescopically relative to the first leg 42.

The collar 84 of the preferred embodiment is made of metal and has a machined inner surface 86 specially shaped to perform the locking and releasing functions. Specifically, the inner surface 86 has a ledge area 88 wherein the inner surface 86 has a reduced diameter, a recessed area 90 wherein the inner surface 86 has a relatively larger diameter, and a ramp area 92 wherein the diameter of the inner surface 86 slopes from the ledge area 88 to the recessed area 90.

Figure 9A:
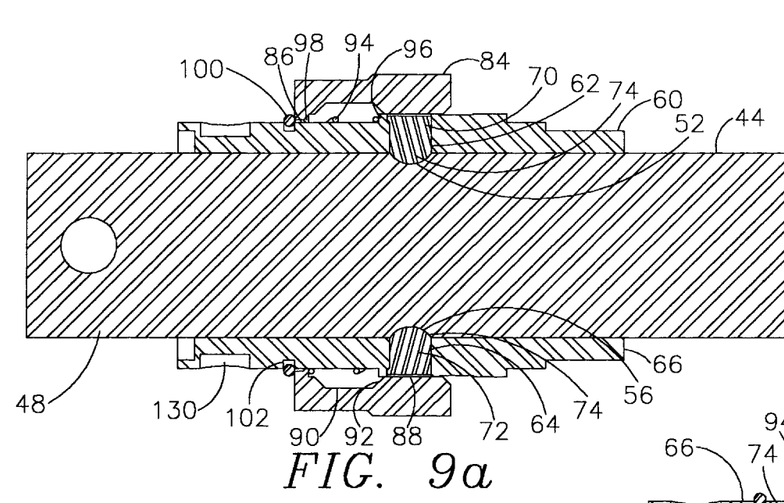
FIG. 9a is a cross-sectional plan view of the towing arm of FIG. 8a showing a towing arm in the collapsed position with the collar in the locked position.

When the collar 84 is in the locked position (FIG. 9a), the ledge area 88 is aligned with the openings 62, 64, and the catches 70, 72 are forced inward through the openings 62, 64 toward the second leg 44 by the ledge area 88. This locked position is only possible when the openings 62, 64 are aligned with one of the pairs of grooves (the first and third grooves 50, 54 to lock the towing arm 10 in the extended position, the second and fourth grooves 52, 56 to lock the towing arm 10 in the collapsed position). When the collar 84 is in the locked position, the ledge area 88 presses the against the catches 70, 72 thereby holding the saddle-shaped surfaces 74 of the catches 70, 72 against their respective grooves 50, 52, 54, 56. Because the catches 70, 72 are pressed into the grooves 50, 52, 54, 56, the second leg 44 cannot telescope relative to the first leg 42, and the legs 42, 44 are locked in a fixed relationship to each other.

Figure 9B:
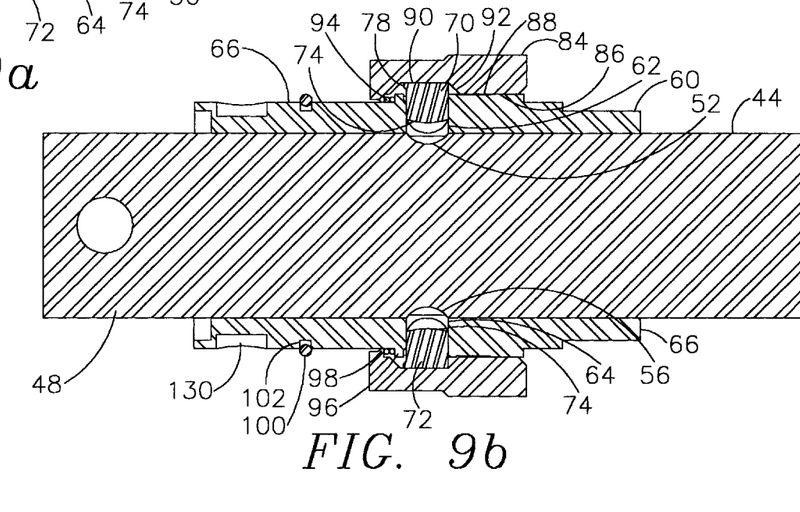
FIG. 9b is a cross-sectional plan view of the towing arm of FIG. 8b showing a towing arm with the collar in the released position.

When the collar 84 is in the released position (FIG. 9b), the recessed area 90 of the collar 84 is aligned with the openings 62, 64, and the catches 70, 72 are free to move outwardly away from the second leg 44. The catches 70, 72 will not be forced away from the grooves 50, 52, 54, 56, and may remain in contact with the grooves 50, 52, 54, 56; however, if force is applied to move the second leg 44 telescopically relative to the first leg 42, the grooves 50, 52, 54, 56 will press against the catches 70, 72 tending to force the catches 70, 72 outward until they are moved back into the recessed area 90 and the legs 42, 44 are free to telescope relative to each other.

A spring 94 is used to bias the collar 84 toward the locked position. The spring 94 is positioned between a spring-retaining ridge 96 on the outside of the spud 66, and a spring-retaining lip 98 on the collar 84. The collar 84 is oriented so that the recessed area 90 of the collar 84 is on the towed-vehicle side of the ledge area 88 of the collar 84. Therefore, the spring-retaining ridge 96 is on the towing-vehicle side of the spring-retaining lip 98 so that the spring 94 tends to urge the collar 84 away from the towing vehicle 148 to the locked position wherein the ledge area 88 of the collar 84 is aligned with the openings 62, 64. Some means is needed to prevent the collar 84 from sliding too far away from the towing vehicle 148 so that the ledge area 88 slides past the openings 62, 64. In the preferred embodiment a snap ring 100 fits in a snap-ring slot 102 machined in the spud 66. When the snap ring 100 is placed in the snap-ring slot 102, the collar 84 is prevented from sliding toward the towed vehicle 150 so far that the ledge area 88 of the inner surface 86 of the collar 84 is no longer aligned with the openings 62, 64.

The spring 94 makes the towing arm 10 self-locking. When the second leg 44 is moved so that its first and third grooves 50, 54 are aligned with the openings 62, 64, the collar 84 will be moved to the locked position automatically by the spring 94. As the collar 84 moves toward the locked position, the ramp area 92 of the inner surface 86 of the collar 84 forces the catches 70, 72 inward so that the saddle-shaped surfaces 74 engage the first and third grooves 50, 54. The sloped quality of the ramp area 92 is necessary to prevent the collar 84 from sticking on the catches 70, 72 without forcing them inward as the collar 84 moves from the released position to the locked position. Once the collar 84 reaches the locked position, the catches 70, 72 will be held in the grooves 50, 54 by the ledge area 88.

Looking again at FIG. 5, it can be seen that the first end 16 of the towing arms 10, 11 are pivotally connected to each other and the coupling 14 by a horizontal pivot bolt 104 that allows pivot of the towing arms 10, 11 in a substantially horizontal plane when the towing assembly 12 is in connection between a towing vehicle 148 and a towed vehicle 150. The preferred coupling 14 is described in a co-pending application, Ser. No. 08/285,224. The coupling 14 has two yokes 106, 108 placed back-to-back. The first yoke 106 is pivotally connected to the towing arms 10, 11 by the horizontal pivot bolt 104, and swivelly connected with the second yoke 108. The second yoke 108 is pivotally connected to the male receiver bar 26 by a vertical pivot bolt 110. The vertical pivot bolt 110 allows for changes in elevation of the towed vehicle 150 relative to the towing vehicle 148 when the tow bar assembly 12 is in connection between the towing vehicle 148 and the towed vehicle 150. The male receiver bar 26 is a square tube which is received and locked into place in a female receiving tube (not shown) at the rear of the towing vehicle 148. Other standard means may be used to affix the coupling 14 to the towing vehicle 148.

The release tool 112 of the present invention may be used to move the collar 84 from the locked position to the released position. The release tool 112 provides a mechanical advantage to make moving the collar 84 easier and more comfortable for the user. Stress can build up between the catches 70, 72 and inner surface 86 of the collar 84 when the collar 84 is in the locked position during towing or if the towed vehicle 150 is not perfectly aligned with the towing vehicle 148. This can make it difficult or impossible to move the collar 84 by hand;. therefore, the release tool 112 allows for easier movement of the collar into the released position when it would otherwise be difficult or impossible.

As best seen in FIGS. 1–4, the release tool 112 is formed by an elongated handle 114 with a stirrup 116 extending from a first end 152 of the handle 114. The handle 114 has a second end 164 opposite from the first end 152. The second end 164 is unattached. The handle 114 may be covered with padding, or a rubberized grip, for comfort and improved tackiness. The stirrup 116 is formed by a first ear 118 and a second ear 120 on opposite sides of the first end 152 of the handle 114. The second ear 120 is a mirror image of the first ear 118. Each ear has an inside surface 160 that faces the other ear, and an outside surface 162 opposing the inside surface 160. At an end opposite from the handle 114, each ear 118, 120 has a fulcrum peg 124 extending from its inside surface 160. While it is contemplated to drill a hole in each ear 118, 120 through which rivets can be inserted and held in place with weldments, to serve as the fulcrum pegs 124, other means can be used to accomplish the purpose of providing a fulcrum point about which the release tool 112 can be pivoted. A cam surface 122 is provided on each ear 118, 120. Each cam surface 122 is convex in shape and located along a curved edge 154 of each ear 118, 120.

The spud 66 has a pair of peg-receiving notches 130 for receiving the fulcrum pegs 124. Each peg-receiving notch 130 has a channel 156 and a slot 158. The channels 156 are open along the top of the first leg 42 and closed at the opposite end of the channel 156, and are oriented so that they are vertical when the towing arms 10, 11 are extended horizontally for towing. The slots 158 extend from the bottom of the channels 156, parallel to the first leg 42, away from the collar 84.

Figure 10A:
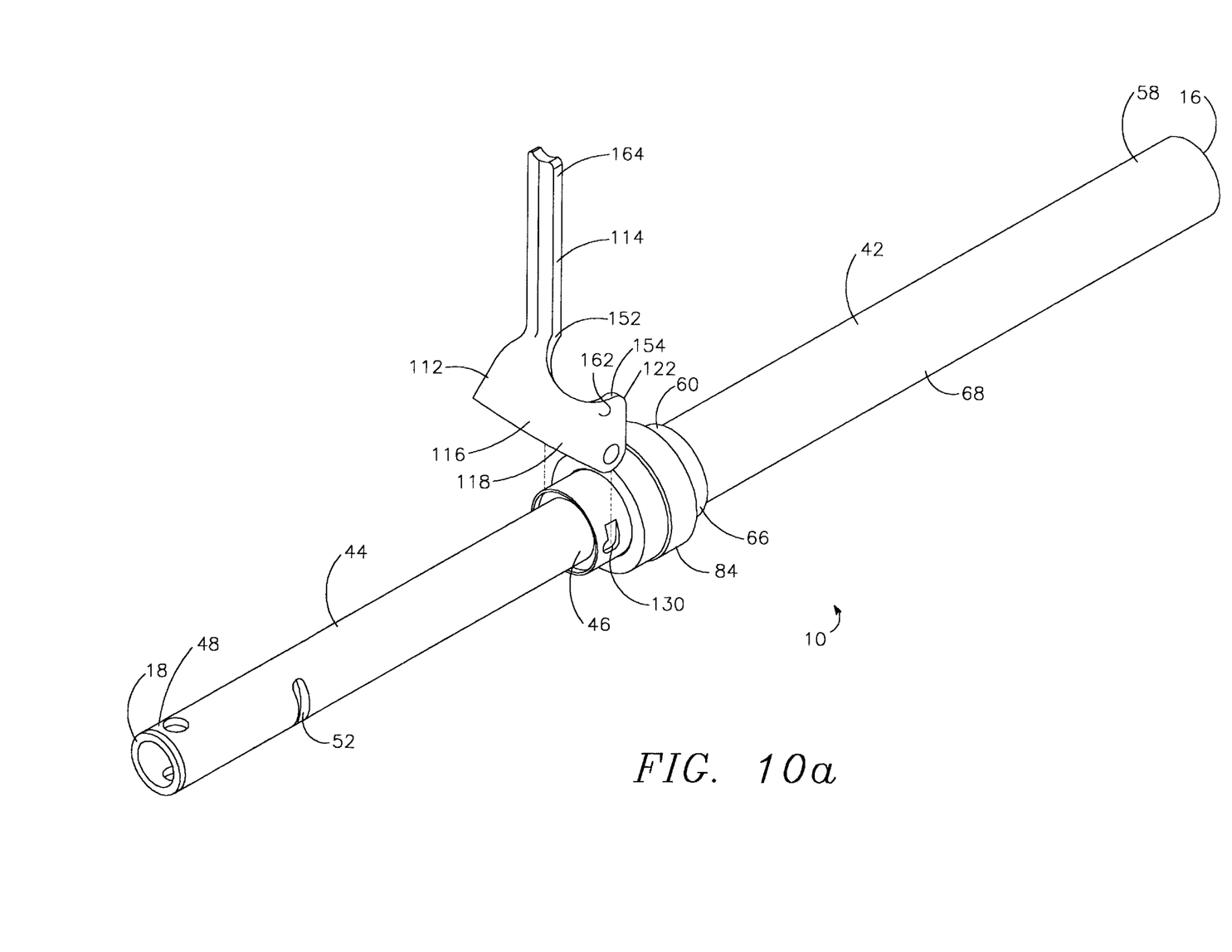
FIGS. 10a–c are perspectives of the towing arm of FIG. 5 illustrating the use of a release tool to move the collar to a released position.
Figure 10B:
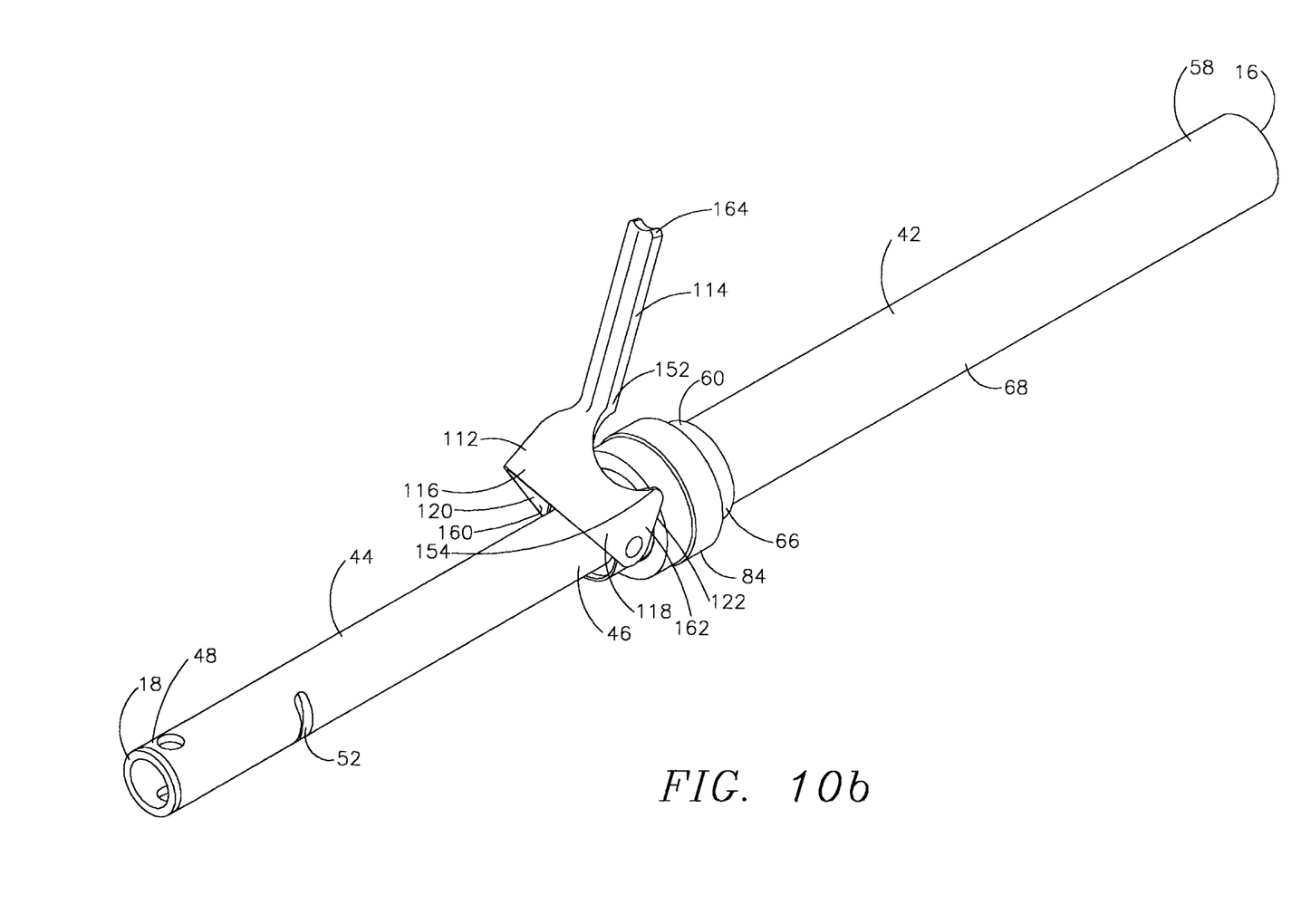
Figure 10C:
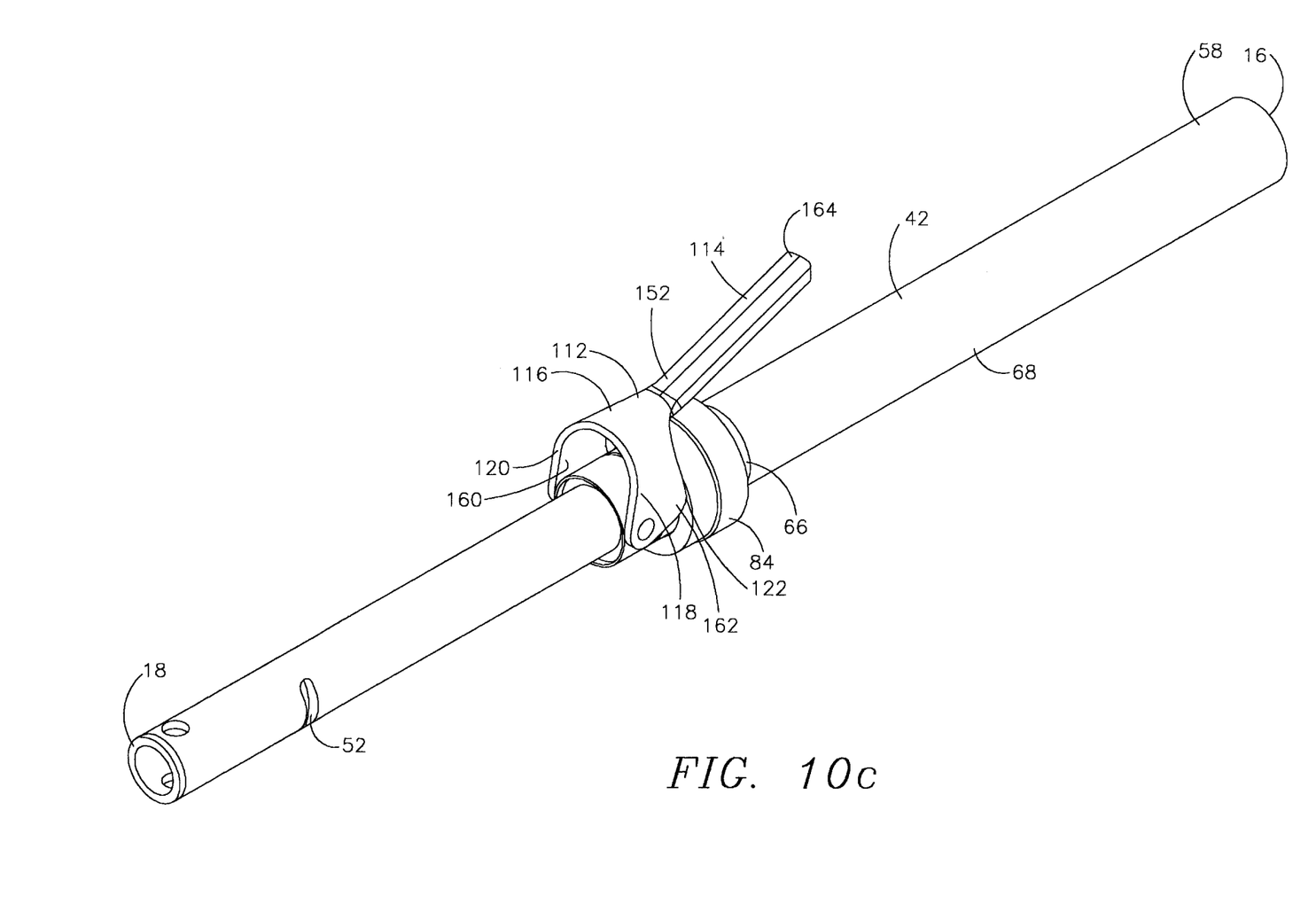

To use the release tool 112, the fulcrum pegs 124 are inserted into the channels 156 with the cam surface 122 proximate to the collar 84 (FIG. 10a). The tool 112 is pushed slightly away from the collar 84 to lock the fulcrum pegs 124 in place in the slots 158. As the handle 114 is pressed downward and toward the collar 84, the release tool 112 rotates about the fulcrum pegs 124. The cam surface 122 engages the collar 84, and forces the collar 84 towards the released position. When the fulcrum pegs 124 are in place in the slots 158 and the cam surface is contacting the collar 84 in the locked position, the second end 164 of the handle 114 is in a locking position (FIG. 10b). When the second end 164 of the handle 114 has been rotated downward and toward the towing arm 10 until the collar 84 is in the released position, the second end 164 of the handle 114 is in a releasing position (FIG. 10c). To move the collar 84 to the released position, the second end 164 of the handle 114 is moved from the locking position to the releasing position (FIGS. 10b–c).

Figure 11:
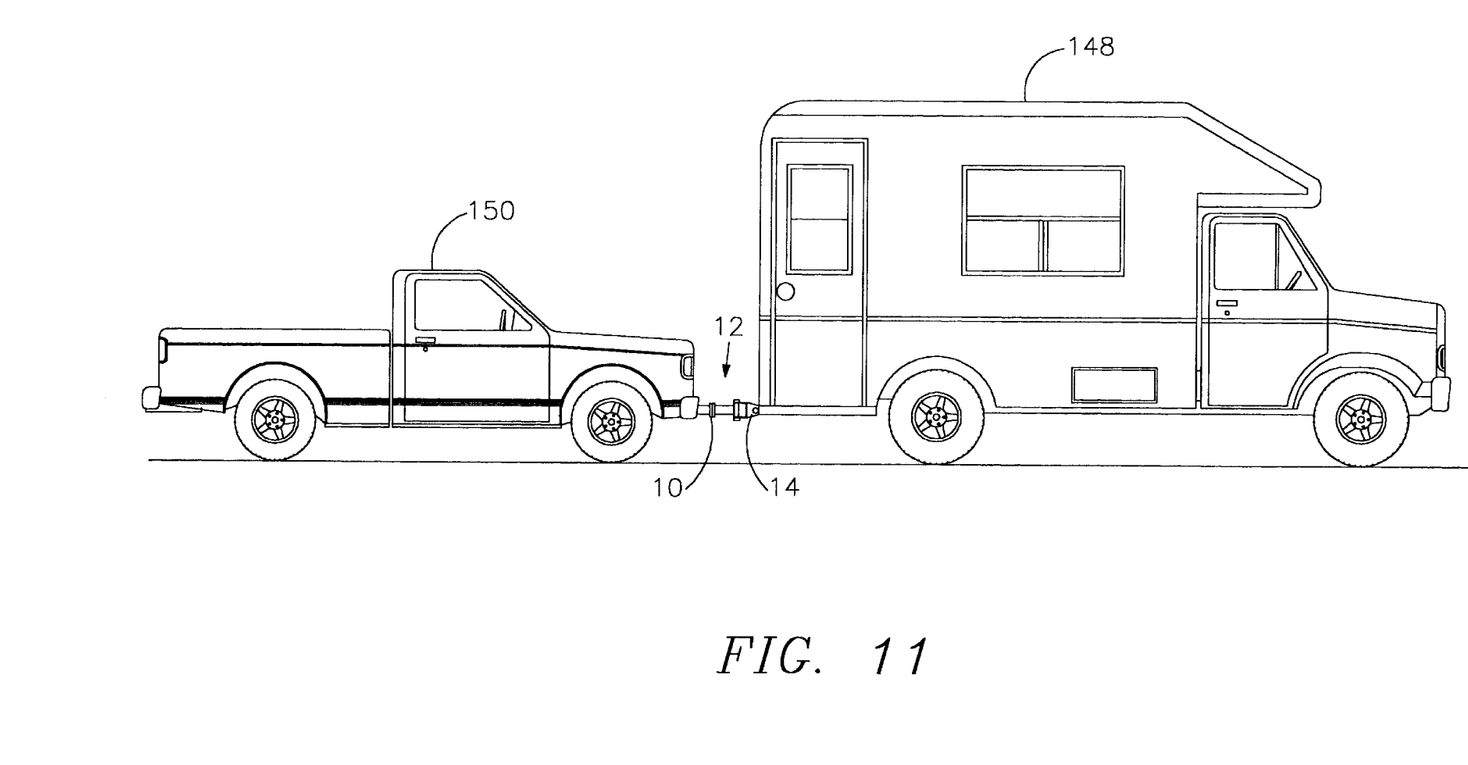
FIG. 11 is an elevational view showing the tow bar assembly of FIG. 5 with the towing arms in an extended position in connection between a towing vehicle and a towed vehicle.
Figure 12:
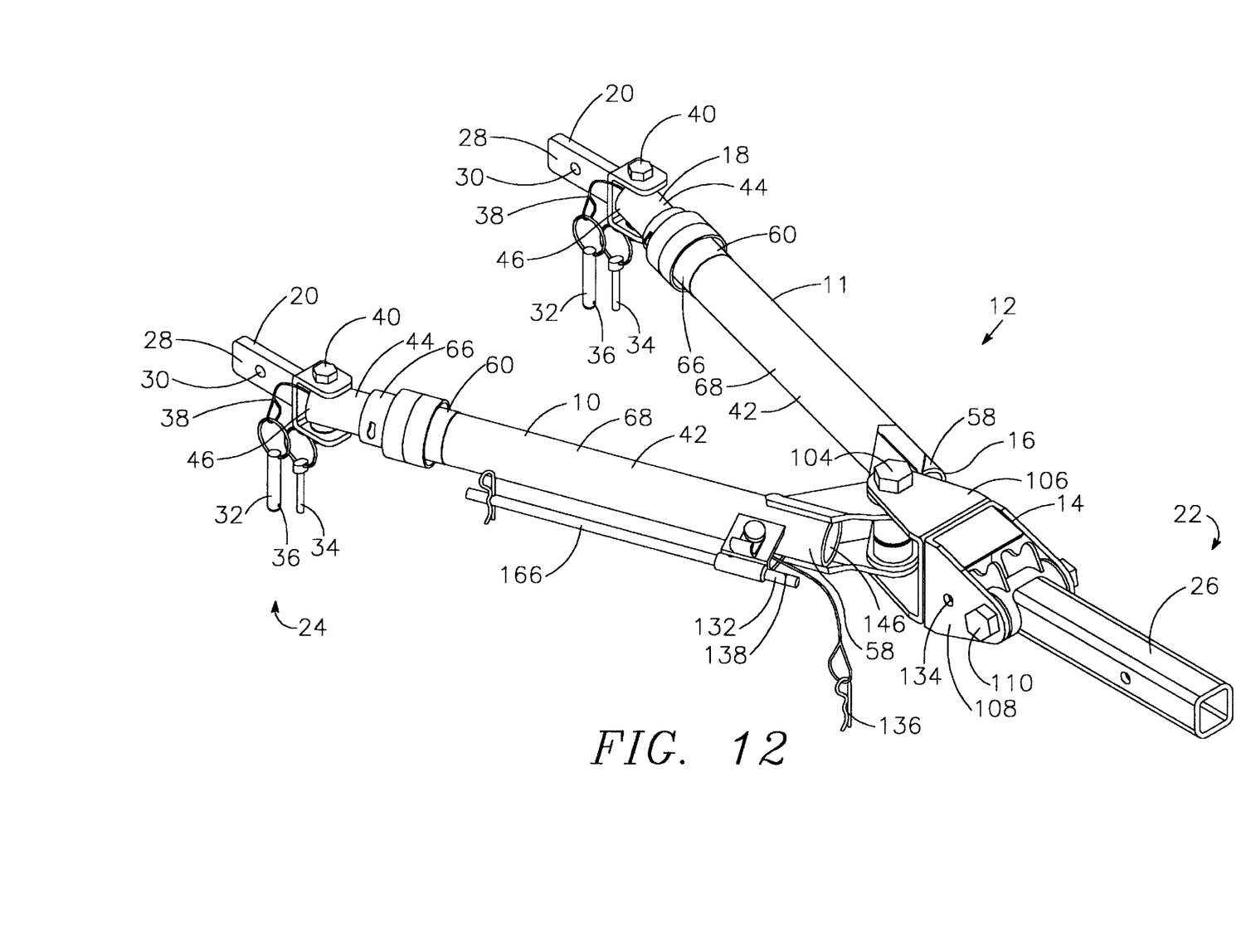
FIG. 12 is a perspective view of the tow bar assembly of FIG. 5 with the towing arms in a collapsed position.

To use the tow bar assembly 12, the male receiver bar 26 is placed in operable connection with the towing vehicle 148. The towed vehicle 150 is moved to approximately two feet from the rear of the towing vehicle 148. The towing arms 10 are extended so that they are substantially parallel with the ground. The collars 84 are moved to the released position, preferably using the release tool 112, and the second leg 44 is slid toward the towed vehicle 150. Once the collars 84 are moved to the released position, and the second leg 44 is slid so that none of its grooves 50, 54 are aligned with the openings 62, 64, the collar 84 will be maintained in the released position by the second leg 44 pressing against the catches 70, 72. The devises 20 can then be attached to the towed vehicle 150 using the attaching dowels 32 and attaching pins 34. The towing vehicle 148 is then slowly pulled forward, thereby pulling the first legs 42 relative to the second legs 44 until the openings 62, 64 are aligned with the first and third grooves 50, 54 and the catches 70, 72 are automatically pushed inward into the grooves 50, 54 by the ramp area 92 of the inner surface 86 of the collar 84 as the collar 84 is urged toward the locked position by the spring 94. The catches 70, 72 will be held in place with the saddle-shaped surfaces 74 engaged with the grooves 50, 54 by the ledge area 88 of the inner surface 86 of the collar 84, and the towing arms 10, 11 will be locked in the extended position for towing (FIG. 11).

The embodiment shown in the drawings is suitable for storage on the towing vehicle 148 when not in use. To move from the operable position in connection between the towing vehicle 148 and the towed vehicle 150 to the storage position, the first step is to set the parking brakes on both the towing vehicle 148 and the towed vehicle 150. Next, any tension or compression in the towing arms 10, 11 is released by using the release tool 112 to move the collars to the release position. The devises 20 can then be unhooked from the towed vehicle 150 by removing the attaching dowels 32 from the apertures 30 in the tongues 28 of the devises 20. The second leg 44 of each towing arm 10, 11 is then moved to the collapsed position (FIG. 12) by moving the collar 84 to the released position, preferably using the release tool 112; then sliding the second leg 44 toward the towing vehicle end 22 of the tow bar assembly 12 until the catches 70, 72 snap into place in the second and fourth grooves 52, 56 as the openings 62, 64 align with those grooves 52, 56, thereby locking the towing arms 10, 11 in the collapsed position.

Once the towing arms 10, 11 are in the collapsed position (FIG. 12), the towing arms 10, 11 are folded together about the horizontal pivot bolt 104. The towing arms 10, 11 and the first yoke 106 are pivoted upward as a unit about the vertical pivot bolt 110 until the towing arms 10, 11 are substantially vertical. The towing arms 10, 11 are then rotated to the side about the horizontal pivot bolt 104 until the towing arms 10, 11 are substantially horizontal. A lockpin 132 attached to one of the towing arms 10 will fit within a hole 134 provided in the second yoke 108. A hairpin clip 136 is inserted in a transverse bore 138 through the lockpin 132 to lock the towing assembly 12 in the storage position on the rear of the towing vehicle 148.

The release tool 112 of the present invention provides an improved way to move the locking collar 84 from the locked position (FIG. 8a) to the released position (FIG. 8b). The handle 114 provides a mechanical advantage that decreases the force a user must apply in order to move the collar 84. This can be important due to the stress that can build-up in towing arms 10 during towing, or when the towed vehicle 150 is not perfectly aligned with the towing vehicle 148. The safety of the system is also improved as the user's hands are moved away from the moving parts.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention. For example, while it is shown to construct the release tool 112 so that the handle 114 extends above the collar when the fulcrum pegs 124 are engaged by the towing arm 10; it is contemplated that the release tool 112 would also work with the handle mounted on the other side of the stirrup 116 so that it extends above the second leg 44 when the fulcrum pegs 124 are engaged with the towing arm 10. In this alternative design, lifting the handle 114 would rotate the cam surface 122 downward and move the collar 84 from the locked position to the released position.

What is claimed is:

1. A release tool for use on a locking telescoping towing arm assembly wherein the towing arm has a first leg for operable connection with a towing vehicle and a second leg for operable connection to a towed vehicle, wherein the first and second legs are telescopically joined together, wherein a collar is received about the first leg and is slidable relative to the first leg between a locked position and a released position, wherein when the collar is in the locked position it holds the second leg axially fixed relative to the first leg, and wherein when the collar is in the released position the second leg is free to move telescopically with respect to the first leg, the release tool comprising:

(a) a cam surface for engagement with the collar;
    (b) fulcrum means for engagement with the towing arm such that said cam surface is between said fulcrum means and the collar; and
    (c) a handle having a first end in operable connection with said cam surface and a second end which is free to rotate between a locking position and a releasing position when the fulcrum means is engaged with the towing arm, said cam surface extending generally in the direction of said handle, said handle rotating said cam surface about said fulcrum means to move the collar between the locked position and the released position as said second end of said handle is moved from said locking position to said releasing position.

2. The release tool according to claim 1, further comprising a stirrup attached to said first end of said handle with a first ear and a second ear extending from opposite sides of said first end of said handle, said fulcrum means being located on said ears.

3. The release tool according to claim 2, wherein:

(a) said first ear has an inner surface and an outer surface opposite from said inner surface;
    (b) said second ear has an inner surface and an outer surface opposite from said inner surface of said second ear, said inner surface of said second ear is facing said inner surface of said first ear; and
    (c) said fulcrum means are a first fulcrum peg extending from said inner surface of said first ear and a second fulcrum peg extending from said inner surface of said second ear.

4. The release tool according to claim 2, wherein said cam surface comprises:

(a) a first convexly curved edge on said first ear; and (b) a second convexly curved edge on said second ear.

5. A combination of a tow bar having telescoping towing arms and a release tool for allowing adjustment of the telescoping arms, the combination comprising:

a tow bar comprising a telescoping towing arm having an outer leg and an inner leg;

a latching mechanism for maintaining said towing arm in an extended position during towing, said latching mechanism being adjustable between a locked position that maintains the inner leg fixed relative to the outer leg and a released position for allowing said inner leg to move telescopically with respect to said outer leg;

a release tool for engagement with said latching mechanism, said release tool having a handle rotatable about a fulcrum to a releasing position to move said latching mechanism into said released position to allow telescopic movement of said inner leg relative to said outer leg.

6. The combination of a tow bar and a release tool according to claim 5, wherein said latching mechanism comprises a sliding collar, and wherein said release tool further comprises a cam surface for engagement with said sliding collar.

7. The combination of a tow bar and a release tool according to claim 6, wherein said cam surface extends generally in the direction of said handle.

8. The combination of a tow bar and a release tool according to claim 5, wherein said release tool further comprises a stirrup attached to said first end of said handle with a first ear and a second ear extending from opposite sides of said handle, said fulcrum being located on said ears.

9. The combination of a tow bar and a release tool according to claim 8, wherein:

said first ear has an inner surface and an outer surface opposite from said inner surface;

said second ear has an inner surface and an outer surface opposite from said inner surface of said second ear, said inner surface of said second ear facing said inner surface of said first ear; and said fulcrum comprises a first fulcrum peg extending from said inner surface of said first ear and a second fulcrum peg extending from said inner surface of said second ear.

10. The combination of a tow bar and a release tool according to claim 9, wherein said cam surface comprises:

a first convexly curved edge on said first ear; and a second convexly curved edge on said second ear.

* * * * *